(12) United States Patent
Lim et al.

(10) Patent No.: US 8,561,145 B2
(45) Date of Patent: Oct. 15, 2013

(54) SERVICE PROVIDING METHOD USING PROFILE INFORMATION AND SYSTEM THEREOF

(75) Inventors: Hun Lim, Seoul (KR); Sung-jin Lee, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 2441 days.

(21) Appl. No.: 11/295,616

(22) Filed: Dec. 7, 2005

(65) Prior Publication Data

US 2006/0168137 A1 Jul. 27, 2006

(30) Foreign Application Priority Data

Dec. 16, 2004 (KR) ........................ 10-2004-0107101

(51) Int. Cl.
*H04L 29/06* (2006.01)
(52) U.S. Cl.
USPC ............................................................ 726/4
(58) Field of Classification Search
USPC ............... 726/4, 5, 9; 709/219; 705/2–45
See application file for complete search history.

(56) References Cited

U.S. PATENT DOCUMENTS

| | | | | |
|---|---|---|---|---|
| 5,245,656 A * | 9/1993 | Loeb et al. | | 713/154 |
| 5,692,048 A * | 11/1997 | Gormish et al. | | 380/246 |
| 6,029,195 A * | 2/2000 | Herz | | 725/116 |
| 6,112,186 A * | 8/2000 | Bergh et al. | | 705/7.32 |
| 6,230,272 B1 * | 5/2001 | Lockhart et al. | | 726/2 |
| 6,761,697 B2 * | 7/2004 | Rubinstenn et al. | | 600/587 |
| 6,941,291 B1 * | 9/2005 | Zoller et al. | | 1/1 |
| 6,993,652 B2 * | 1/2006 | Medvinsky | | 713/155 |
| 7,103,663 B2 * | 9/2006 | Inoue et al. | | 709/225 |
| 7,181,488 B2 * | 2/2007 | Martin et al. | | 709/200 |
| 7,249,182 B1 * | 7/2007 | Heinonen et al. | | 709/227 |
| 7,269,854 B2 * | 9/2007 | Simmons et al. | | 726/29 |
| 7,343,014 B2 * | 3/2008 | Sovio et al. | | 380/278 |
| 7,360,251 B2 * | 4/2008 | Spalink et al. | | 726/26 |
| 7,409,560 B2 * | 8/2008 | Mori | | 713/189 |
| 7,509,667 B1 * | 3/2009 | Cook | | 725/87 |
| 7,515,569 B2 * | 4/2009 | Prasad | | 370/338 |
| 8,166,564 B2 * | 4/2012 | Nomura | | 726/27 |
| 8,447,359 B2 * | 5/2013 | Hyyppa et al. | | 455/558 |
| 2001/0013037 A1 * | 8/2001 | Matsumoto | | 707/5 |
| 2001/0025280 A1 * | 9/2001 | Mandato et al. | | 707/3 |
| 2001/0027527 A1 * | 10/2001 | Khidekel et al. | | 713/201 |
| 2002/0053735 A1 * | 5/2002 | Neuhaus et al. | | 257/728 |
| 2002/0166047 A1 * | 11/2002 | Kawamoto | | 713/169 |
| 2003/0005134 A1 * | 1/2003 | Martin et al. | | 709/229 |
| 2003/0074456 A1 * | 4/2003 | Yeung et al. | | 709/229 |

(Continued)

FOREIGN PATENT DOCUMENTS

| | | |
|---|---|---|
| CN | 1497471 A | 5/2004 |
| JP | 2002032372 A | 1/2002 |

(Continued)

*Primary Examiner* — David García Cervetti
(74) *Attorney, Agent, or Firm* — Sughrue Mion, PLLC

(57) ABSTRACT

A service providing method using profile information and a system thereof is provided. According to the invention, in order to provide profile information for serving a user to a service provider at a place other than a home, a user device, an external device, an authentication server and a profile server are provided and interconnected through a network such as the Internet. Accordingly, the service provider can provide the best services to users, and users can be provided with services that are the same as those provided at home.

43 Claims, 7 Drawing Sheets

(56) References Cited

U.S. PATENT DOCUMENTS

| | | | |
|---|---|---|---|
| 2003/0149781 A1* | 8/2003 | Yared et al. | 709/229 |
| 2003/0236714 A1* | 12/2003 | Kageyama | 705/26 |
| 2004/0001088 A1* | 1/2004 | Stancil et al. | 345/748 |
| 2004/0062400 A1* | 4/2004 | Sovio et al. | 380/286 |
| 2004/0064480 A1* | 4/2004 | Bartlett et al. | 707/104.1 |
| 2004/0078343 A1* | 4/2004 | Morita | 705/80 |
| 2004/0098582 A1* | 5/2004 | Mori | 713/156 |
| 2004/0111518 A1* | 6/2004 | Schuyler | 709/228 |
| 2004/0153411 A1* | 8/2004 | Viger et al. | 705/51 |
| 2005/0065950 A1* | 3/2005 | Chaganti et al. | 707/100 |
| 2005/0157660 A1* | 7/2005 | Mandato et al. | 370/254 |
| 2005/0192008 A1* | 9/2005 | Desai et al. | 455/435.2 |
| 2005/0281237 A1* | 12/2005 | Heinonen et al. | 370/338 |
| 2006/0059183 A1* | 3/2006 | Pearson et al. | 707/101 |
| 2006/0080526 A1* | 4/2006 | Kasahara et al. | 713/155 |
| 2006/0080734 A1* | 4/2006 | Kim et al. | 726/15 |
| 2006/0085638 A1* | 4/2006 | Phillips et al. | 713/168 |
| 2006/0085639 A1* | 4/2006 | Phillips et al. | 713/168 |
| 2006/0265405 A1* | 11/2006 | Baugher et al. | 707/10 |

FOREIGN PATENT DOCUMENTS

| | | |
|---|---|---|
| JP | 2004-030653 A | 1/2004 |
| KR | 2000-0072818 A | 12/2000 |
| KR | 2002-0006810 A | 1/2002 |
| KR | 2002-0018321 A | 3/2002 |

* cited by examiner

SERVICE PROVIDING METHOD USING PROFILE INFORMATION AND SYSTEM THEREOF

This application claims priority, under 35 U.S.C. §119, from Korean Patent Application No. 2004-107101, filed on Dec. 16, 2004, the entire content of which is incorporated herein by reference.

BACKGROUND OF THE INVENTION

1. Field of the Invention

Apparatuses and methods consistent with the present invention relate to the information technology of a network. More specifically, the invention relates to a service providing method using profile information and a system thereof, in which user profile information accumulated in a home server for a long period of time is selectively provided to external devices.

2. Description of the Related Art

Every person has a different living pattern. For example, a person may have his or her own patterns of behavior including eating style, the best sleeping environments, or the like.

Even the same person shows different patterns of behavior according to the current situation, weather, or health condition. For example, suppose a person is going to have lunch. If the person is currently at a restaurant outside of his home, the person will give up on having a particular lunch of his or her own to a certain extent. Generally, the person's selection for lunch is influenced by various environments, and the person's particular tastes, such as a bit salty or hot tastes, are sometimes ignored. However, this can be the cause of stress to the person. The tastes for one meal can be ignored. However, it is a different matter if it relates to the person's health.

However, in order to be provided with a menu reflecting the person's eating habits, health conditions, or recent biorhythms, much more information is needed, and people's efforts to obtain the information is needed as well.

As another example, when a person is going to purchase clothes or shoes, to exercise, to sleep at a hotel, or to be treated at a hospital, similar problems can arise.

That is, in order to provide high quality services, i.e. grasping a user's intention and proposing and delivering appropriate services, a user profile including the user's inclinations, likings, and living patterns accumulated over a long period of time is needed.

According to conventional home network systems, such a user profile can be stored in a home server. However, a method of being provided with such services outside of a home has not been proposed. That is, a method of utilizing profile information accumulated inside of a home is required.

SUMMARY OF THE INVENTION

Illustrative, non-limiting embodiments of the present invention have been provided to overcome the above disadvantages and other problems not described above. Also the present invention is not required to overcome the disadvantages described above, and an illustrative, non-limiting embodiment of the present invention may not overcome any of the problems described above. An aspect of the invention is to provide a service providing method using profile information and a system thereof, in which user profile information accumulated at a home server is provided to a system located at another location outside of a home, and services appropriate to a user's living patterns, inclinations, and likings can be provided.

According to one aspect of the invention, there is provided a service providing method for an external device on a network using profile information. The method comprises: connecting a user device, comprising a user key, to the external device; transferring its own external device information to the user device and receiving the external device information encrypted using the user key; requesting profile information required to serve a user of the user device by transmitting the encrypted external device information to a profile server which may store profile information on a user's living patterns accumulated for a long period of time; and receiving the profile information provided by the profile server that determines the request as being authorized.

In this case, the user device may comprise at least one of wired and wireless interfaces for connecting to the external device.

The encrypted external device information may include an event number created by the user device and decrypted by the profile server for user confirmation.

In addition, requesting of the profile information is performed using an unencrypted address of the profile server that is received from the user device.

In order to determine whether the request of profile information is authorized, the above method may comprise: granting a site key to the external device using an authentication server prior to receiving the external device information; inserting the site key into the external device information; and determining, using the site key, whether the external device is an authorized device.

The above method may further comprise: registering with the authentication server, when granting the site key, a list of selection information needed by the external device out of the profile information; and receiving the needed selection information out of the profile information, when the external device is determined to be an authorized one, the needed selection information corresponding to the list registered with the authentication server.

The profile information requested by the external device may comprise, for example, any one of information on eating habits, a user's measurements, preferred styles, preferred colors, sleeping, basic living, physical strength, emergency treatments, case history, and particular facts.

In addition, a service providing system using profile information is provided according to another aspect of the invention. The system comprises: a profile server storing profile information for serving a user of a user device, receiving a request for the profile information, and outputting the profile information if the request is determined as being authorized; the user device comprising a user key provided by the profile server; and an external device transmitting the request and receiving the profile information. Here, the request includes external device information of its own that was transferred to the user device and returned after having been encrypted using the user key.

The user device may comprise at least one of wired and wireless interfaces for connecting to the external device. In the case where the user device comprises a wireless interface, the wireless interface may comprise one of a Radio Frequency Identification (RFID) and a smart card.

In the above system, the user device may be configured to create an encrypted event number which is decrypted by the profile server for user confirmation.

The external device may be configured to receive an unencrypted address for the profile server from the user device, together with the encrypted external device information.

According to still another aspect of the invention, the above service providing system may further comprise an authentication server. The authentication server may be configured to grant a site key to the external device and confirm the site key; and the external device may be configured to insert the site key to the external device information.

Further, the authentication server may be configured to register, when granting the site key, a list of selection information needed by the external device out of the profile information, and the external device may be configured to receive the needed selection information out of the profile information, when the external device is determined to be an authorized one, the needed selection information corresponding to the list registered with the authentication server.

In the above service providing system, the profile server may be configured to store the profile information comprising, for example, any one of information on eating habits, user's measurements, preferred styles, preferred colors, sleeping, basic living, physical strength, emergency treatments, case history, and particular facts.

In addition, the service providing system may further comprise a network in which the external device, the authentication server, and the profile server are connected through at least one of wired and wireless interfaces. Furthermore, the profile server can be a home network server of the user's.

According to a still further aspect of the invention, there is provided a service providing method for an external device on a network using profile information that does not necessitate the authentication server. The method comprises: connecting a user device to a profile server that stores profile information required to serve a user of the user device; transferring the profile information to the user device; transferring to the user device a list of selection information needed by the external device out of the profile information; and receiving only information permitted by the user out of the selection information. This aspect of the invention also provides a service providing system that does not necessitate the authentication server. The system comprises: a profile server that stores profile information required to serve a user of a user device; the user device that receives the profile information from the profile server; and an external device that transfers to the user device a list of needed selection information out of the profile information, and receives only information permitted by the user out of the selection information.

BRIEF DESCRIPTION OF THE DRAWINGS

The above aspects and features of the present invention will be more apparent by describing exemplary embodiments of the present invention with reference to the accompanying drawings, in which.

DETAILED DESCRIPTION OF THE EXEMPLARY EMBODIMENTS

Certain embodiments of the present invention will be described in greater detail with reference to the accompanying drawings.

Figure 1:
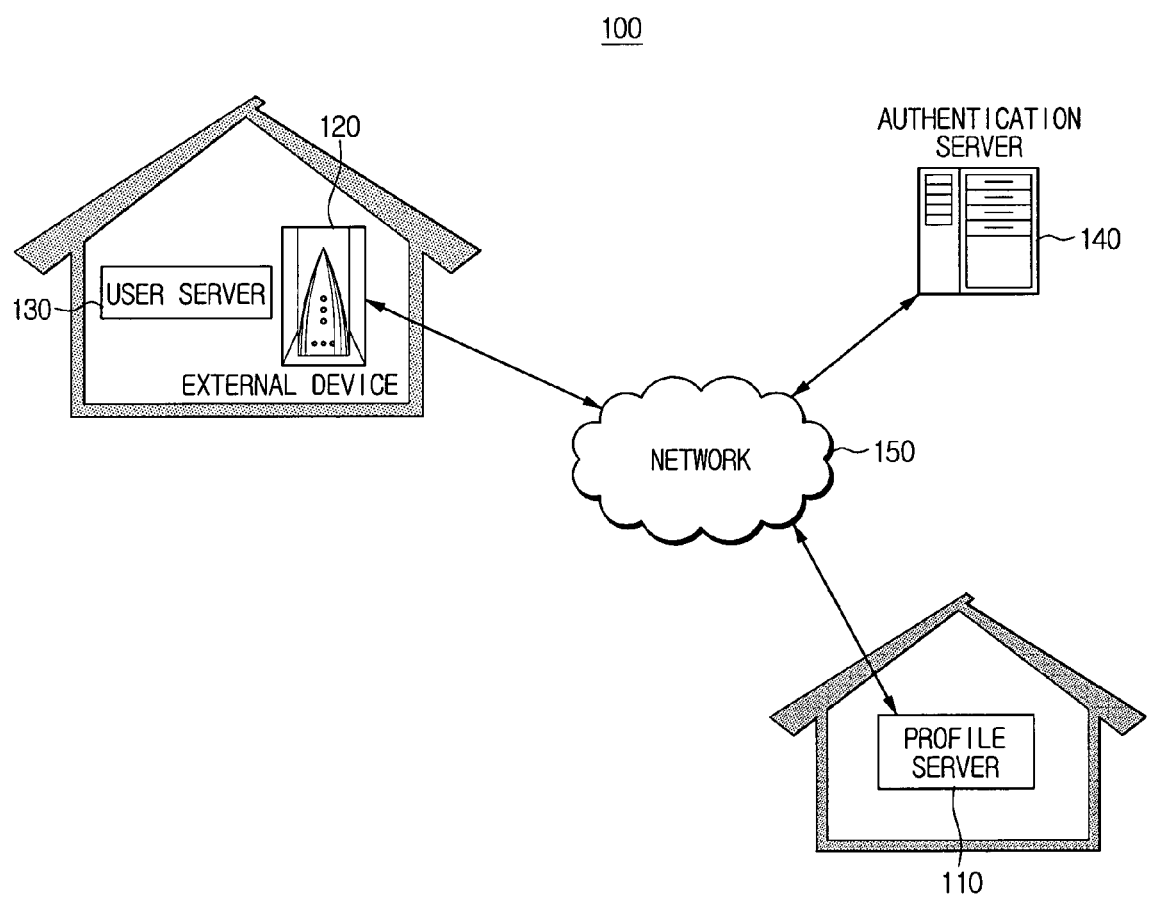
FIG. 1 shows a service providing system using profile information according to an exemplary embodiment of the invention.

FIG. 1 shows a service providing system using profile information according to an exemplary embodiment of the invention.

Hereafter, the general operations of a service providing system 100 of the invention are explained schematically. Referring to FIG. 1, a service providing system 100 of the invention includes a user device 130, in which an external device 120, an authentication server 140, and a profile server 110 are interconnected through a network 150.

The service providing system 100 of the invention provides a user profile accumulated through a home network or the like to an external device located outside of a home so that the same services may be provided as delivered at home. Accordingly, various service providers outside the home may provide the best services to users through the system 100 of the invention, and differentiate themselves from other service providers.

The profile server 110 has at least one piece of information on a user's living patterns, inclinations, and likings (hereafter, referred to as a profile), performs an authentication process in response to a request from an external device 120, the request requesting the information (hereafter, referred to as selection information) needed by the corresponding external device 120 from the profile, and transfers the corresponding needed selection information to the external device 120.

A user profile may be changed arbitrarily through user settings. However, it may also be created by the history management of information accumulated through a home network over a long period of time. A user profile may include at least one piece of information on eating habits, sleep information on sleeping patterns, and health information including a user's weight, physical strength, nutritional intake, case history, and dietary history.

Generally, a profile server 110 is installed remotely from an external device 120. A profile server 110 may be installed inside a user's home while an external device 120 may be installed at a place outside of a home. An external device 120 may be installed at a place where conveniences and services are provided to users such as a restaurant, a hotel, a fitness club, a hospital, and a store. Hereafter, an external device 120 is assumed to be installed at a restaurant for convenience of explanation.

If a user device 130 is connected to an external device 120 located at a restaurant, the external device 120 requests a profile by sending the information on the external device itself (hereafter, referred to as "external device information") to the profile server 110 through a network 150, the information being encrypted using a "user key" at the user device 130. The external device information includes the site key of the external device 120 explained below, the Uniform Resource Locator (URL) of the external device 120, current time, and the like, and can be varied according to the place where the external device 120 is located and the purpose of the profile request.

The profile server 110 decrypts the profile request received from the external device 120, confirms the user as being registered, and transmits selection information to the external device 120.

Since the information provided by a profile server 110 to an external device 120 is the personal information of a user, reliability needs to be maintained as highly confidential, so that the information needs to be protected by an encryption technology or an authentication technology. Therefore, an external device 120 according to an exemplary embodiment of the invention may be configured to be registered at a separate authentication server 140, and receive a site key from the authentication server 140. Every external device 120 determines the needed selection information in advance.

Furthermore, the profile request sent by the external device 120 does not include the kinds of the selection information the external device 120 requests. The profile request may only request a profile and includes the external device information. When the profile server 110 receives a profile request from the external device 120, it requests confirmation from the authentication server 140 if the external device 120 is a device registered with the authentication server 140, and receives selection information needed by the external device 120 together with confirmation.

The external device 120 receives the selection information from the profile server 110, thereby providing higher quality services to users.

Hereafter, referring to FIG. 1, the constituent components of the service providing system 100 of the invention are explained in detail.

The network 150 includes a wired or a wireless network, and may be the Internet.

The user device 130 includes a wired or a wireless interface (not shown) that can be connected to the external device 120 and to the profile server 110, and has a user key received from the profile server 110. A Radio Frequency Identification (RFID), a smart card, or the like can be used as an interface of the user device 130. The user device 130 is connected to the external device 120, encrypts the external device information transferred from the external device 120, together with an event number, using a user key, and returns the encrypted information to the external device 120. At this point, the URL of the profile server 110 is sent without being encrypted at the same time.

The event number, which is generated to show that the profile request of the external device 120 sent to the profile server 110 is authenticated by a user, is encrypted together with the external device information and sent to the profile server 110 through the external device 120. The event number is counted at the profile server 110 for each user, so that a duplicated profile request from the external device 120 and a profile request without a user's permission can be prevented.

The external device 120 that can be connected to the network 150 includes a wired or a wireless interface (not shown) to which the user device 130 can be connected, and has a separate URL in a case where the network 150 is the Internet. The interface included for the connection of the external device 120 to the user device 130 can be a card reader corresponding to the RFID.

The external device 120 can be installed in a service provider's area such as a restaurant, a hospital, a hotel, and a fitness club, the service provider providing services to users. The external device 120 may be registered with the authentication server 140. The external device 120 is registered with the authentication server 140 when determining a needed selection information list. The external device 120 receives a site key from the authentication server 140 upon registration, and inserts the site key into the external device information that is transmitted to the user device 130. The site key may have a valid date set to a certain date.

The external device 120 transmits the external device information to the user device 130, receives encrypted external device information, an encrypted event number, and an unencrypted URL for the profile server 110 from the user device 130, and requests a profile from the profile server 110 having that URL.

After the profile server 110 performs a series of processes, the external device 120 receives the encrypted selection information from the profile server 110, and sends the received selection information to the user device 130 in order to decrypt it. The external device 120 finally receives the decrypted selection information from the user device 130 and provides the best services to users using the received selection information.

The profile server 110 has at least one registered user's profile and includes an interface (not shown) to be connected to the network 150. The profile server 110 can be included in a home network (not shown) and can be operated as a home server of the home network (not shown). A registered user can be a user registered at the home server.

Upon receiving a profile request from the external device 120, the profile server 110 confirms the user by decrypting the encrypted external device information and event number using the user key secured in advance, and performs user authentication by comparing the received event number with the event number, which has been stored previously and counted, in order to judge if the event numbers are identical.

After completing the user authentication, the profile server 110 requests external device 120 authentication from the authentication server. The profile server 110 receives a selection information list provided by the authentication server 140 after authenticating the external device 120. Then, the profile server 110 encrypts and transmits the selection information to the external device 120 according to the received selection information list.

An authentication server 140, which is a device for registering external devices 120 and granting site keys for authentication to external devices 120, can be connected to a network 150 and, in general, may be located at a place other than the places where a profile server 110 and an external device 120 are mainly located. An authentication server 140 can provide a home page for a device connected to the authentication server 140 through a network 150. In this case, the authentication server 140 can be the server of the corresponding home page.

Upon receiving a request for confirmation of an external device from the profile server 110, the authentication server 140 confirms the external device 120 through the site key of the external device 120 received from the profile server 110, and transmits a selection information list needed by the external device 120 to the profile server 110.

Figure 2:
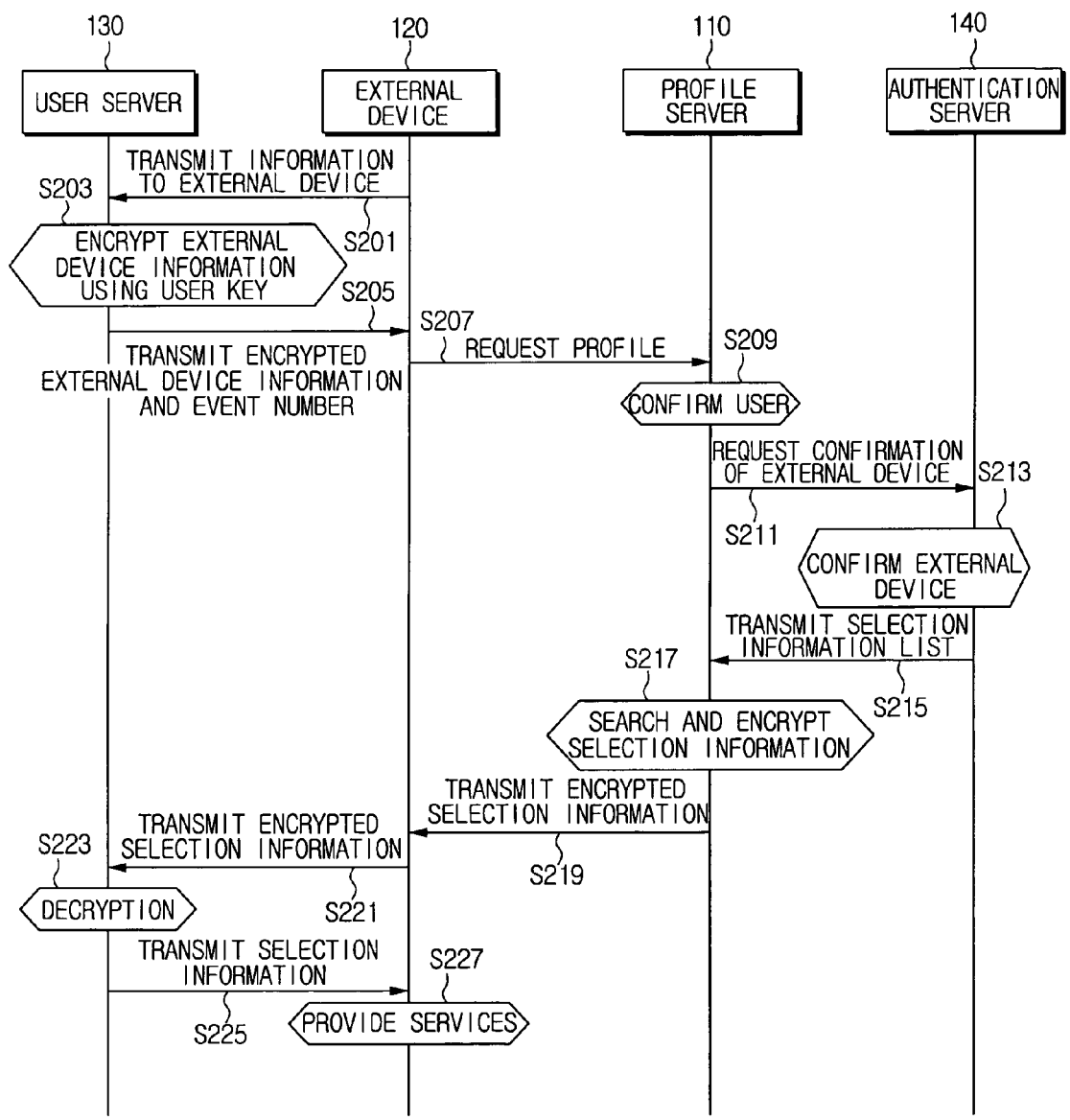
FIG. 2 shows a flow chart explaining a service providing method using profile information according to an exemplary embodiment of the invention.

FIG. 2 shows a flow chart explaining a service providing method using profile information according to an exemplary embodiment of the invention.

Upon confirming the connection of the user device 130, the external device 120 sends external device information to the user device 130 S201.

Upon receiving the external device information from the external device 120, the user device 130 generates an event number and encrypts the generated event number and the external device information using the user key secured in advance (S203).

The user device 130 sends the encrypted external device information and the encrypted event number together with the unencrypted URL of the profile server 110 to the external device 120 (S205).

The external device 120 requests a user profile by sending the external device information and event number encrypted by the user device 130 to the URL of the profile server 110 (S207).

On receiving the request for the transmission of a profile from the external device 120, the profile server 110 decrypts the received external device information and event number using at least one of the user keys secured in advance. In this manner, the decryption is performed using the user key of a registered user, and if the event number generated by the corresponding user is judged to be identical to the event number that the profile server 110 is counting, the process of user confirmation is completed (S209).

After completing the user confirmation, the profile server 110 requests confirmation of the external device from the authentication server 140 (S211).

Upon receiving the request for confirmation of the external device 120 from the profile server 110, the authentication server 140 confirms the external device 120 through the site key of the external device 120 received from the profile server 110 (S213).

When the external device 120 is confirmed to be a registered device, the authentication server 140 transmits a selection information list requested by the external device 120 to the profile server 110 S215.

Upon receiving the selection information list from the authentication server 140, the profile server 110 searches the profile for the selection information on the selection information list. The profile server 110 encrypts and transmits to the external device 120 the selection information (S217) which has been found as a result of the search (S219).

The external device 120 transmits the received encrypted selection information to the user device 130 (S221).

The user device 130 receives the encrypted selection information from the external device 120, decrypts the selection information using its own user key (S223), and transmits the decrypted selection information to the external device 120 (S225).

The external device 120 provides services to users using the selection information received from the user device 130 (S227).

By the method described above, services are provided using the profile information according to an exemplary embodiment of the invention.

However, the authentication server 140 and the user device 130 are not indispensable, so that the authentication server 140 can be excluded in another exemplary embodiment of the invention. In a case where the authentication server 140 is excluded from the service providing system 100 of the invention, the confirmation of an external device 120 and the provision of a selection information list can be performed by a user or a user device 130. That is, the external device 120 offers a proposed selection information list to the user device 130, and only the profile of the selection information selected by the user from the proposed selection information list is provided.

In addition, the user device 130 can be equipped with an interface for connection to a network 150 and is directly connected to the profile server 110 from outside a home. The user device 130 receives only the needed information corresponding to the selection information list from the external device 120, receives directly from the profile server 110 only the selection information that a user permits to be opened among the list, and provides it to the external device 120.

Hereafter, diverse exemplary embodiments are explained according to the location of an external device 120 and the type of service.

Figure 3:
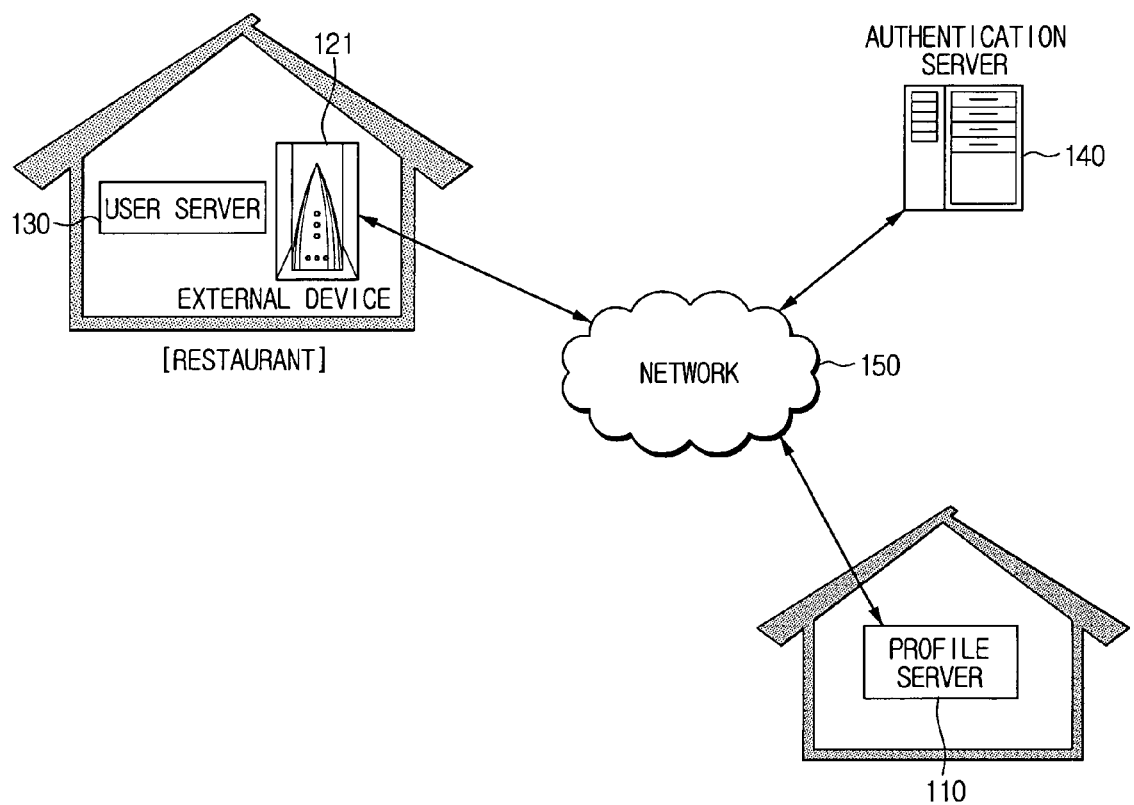
FIG. 3 explains a service providing method embodied for use at a restaurant according to an exemplary embodiment of the invention.

FIG. 3 explains a service providing method embodied for use at a restaurant according to an exemplary embodiment of the invention. A reference number in FIG. 3 that is the same as the one in FIG. 1 denotes the same device operating in the same manner, and will not be explained hereafter.

Referring to FIG. 3, an external device 121 is located at a restaurant. In this case, the external device 121 can be the server device of the restaurant's Internet home page.

When registering an external device 121 with an authentication server 140, user information such as eating habits, case history, and particular facts can be included in the selection information, and the external device 121 can request all or a selected portion of the user information. The information on eating habits includes a user's general tastes for foods represented as hot, salty, not salty, fully cooked, rarely cooked, or the like. The information on case history is food information including foods that can be influenced by the user's case history or current health conditions. In addition, the particular facts are the foods that a user avoids, whether the user is a vegetarian or not, and the like.

In addition, information such as eating habits, case history, and particular facts in the external device 121 can be classified based on purpose. The purpose can be a breakfast, lunch, or dinner. That is, eating habits, case history, and particular facts classified into breakfast, lunch, or dinner can be included. The selection information may be classified in more detail, since the more the information is classified in detail, the less the information will be opened.

At a restaurant, the optimum menu can be proposed to a user based on the selection information, and an emergency situation arising from an improper selection of foods can be prevented in advance.

Figure 4:
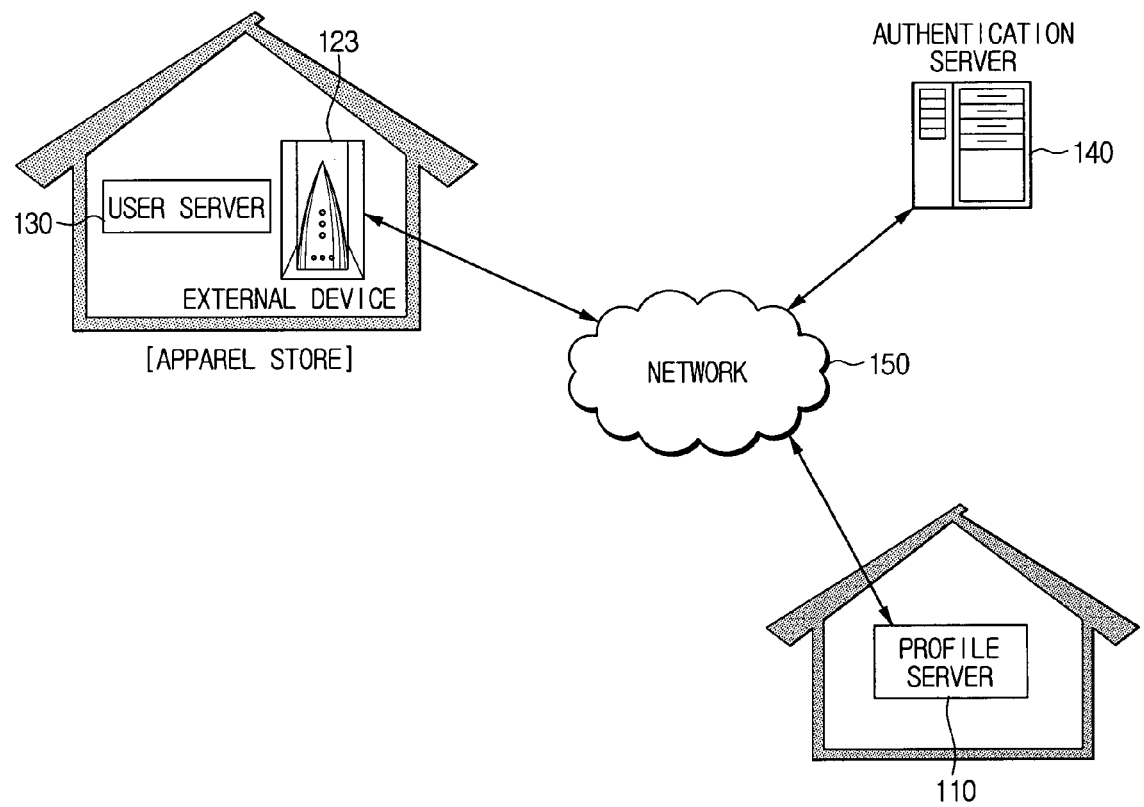
FIG. 4 explains a service providing method embodied for use at an apparel store according to an exemplary embodiment of the invention.

FIG. 4 explains a service providing method embodied for use at an apparel store according to an exemplary embodiment of the invention. A reference number in FIG. 4 that is the same as the one in FIG. 1 denotes the same device operating in the same manner, and will not be explained hereafter.

Referring to FIG. 4, an external device 123 is located at an apparel store. In this case, the external device 123 can be a server device of the apparel store's Internet home page. An apparel store is a place where various kinds of clothing are sold, which is an example of a store where tangible goods are sold such as a shoe store or an accessory store.

When registering an external device 123 with an authentication server 140, user information such as measurements, preferred styles, and colors can be included in selection information, and the external device 123 can request all or a selected portion of the user information. The information on measurements includes a user's various physical dimensions including neck size, waist size, chest size, foot size, height, and the like.

At an apparel store, proper clothes can be proposed to a user based on the selection information, and the user can be helped in selecting the best choice according to a user's preferences.

Figure 5:
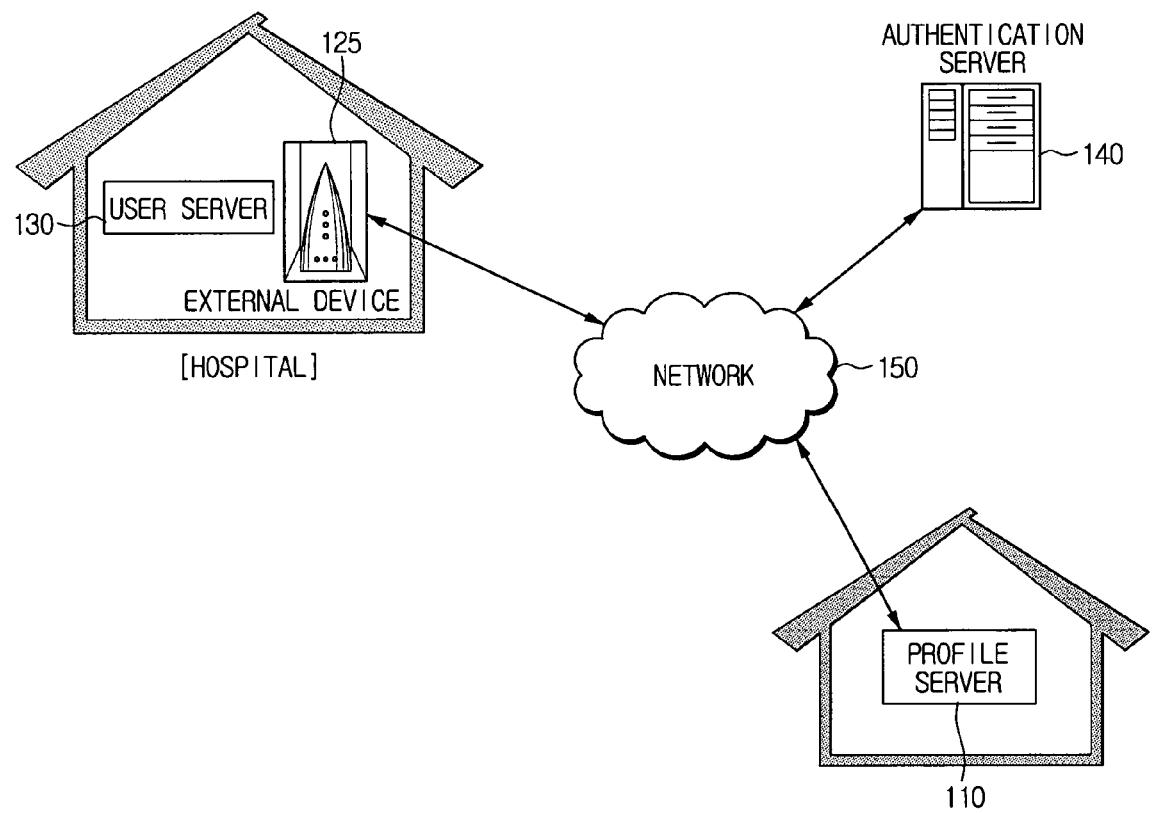
FIG. 5 explains a service providing method embodied for use at a hospital according to an exemplary embodiment of the invention.

FIG. 5 explains a service providing method embodied for use at a hospital according to the invention. A reference number in FIG. 5 that is the same as the one in FIG. 1 denotes the same device operating in the same manner, and will not be explained hereafter.

Referring to FIG. 5, an external device 125 is located at a hospital. In this case, the external device 125 can be a server device of the hospital's Internet home page.

When registering an external device 125 with an authentication server 140, user information such as emergency measures, case history, and particular facts can be included in the selection information, and the external device 125 can request all or a selected portion of the user information. The information on emergency measures includes a user's name, age, identification number, blood type, guardian, guardian's contact information, measurements, eyesight, and the like. The particular facts may include information on recent sleeping conditions, meals, and the like.

At a hospital, a user's emergency situation can be coped with based on the selection information received from the profile server 110 through the external device 125. For example, a guardian can be contacted by the hospital, and a patient can be given a proper medical test or treatment. In addition, even in a case where it is not an emergency situation, the best services can be offered based on the selection information.

Figure 6:
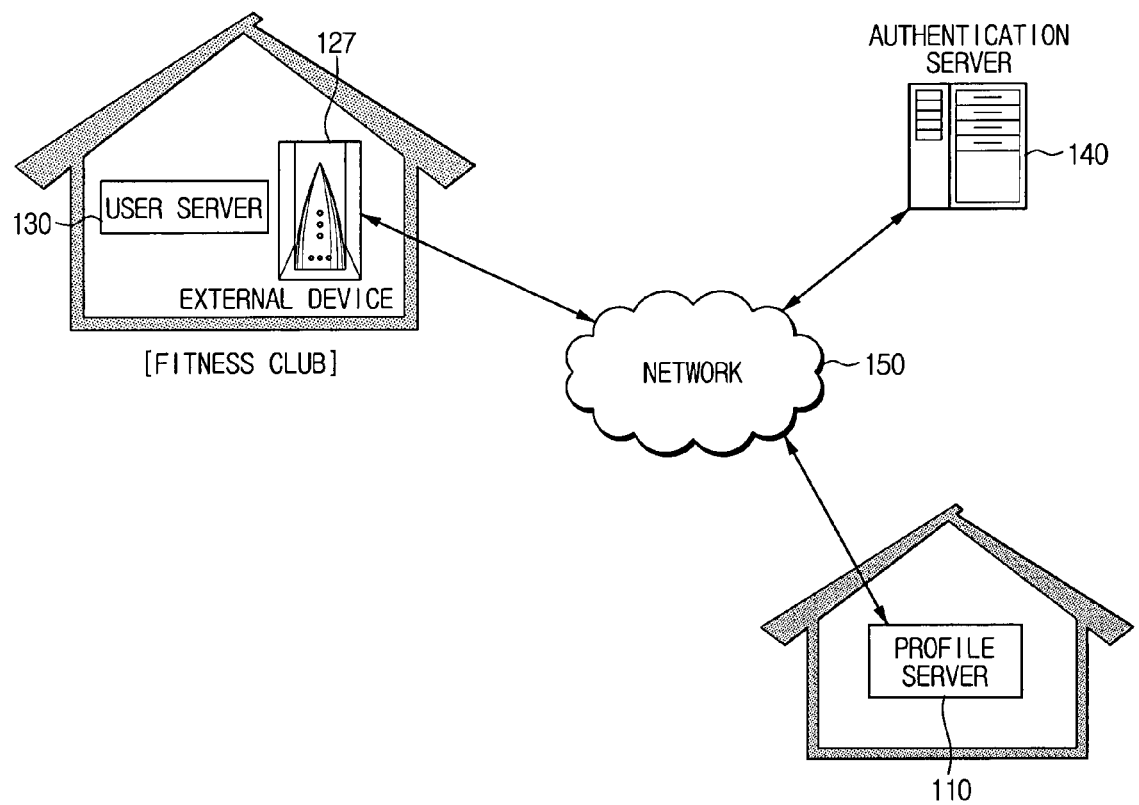
FIG. 6 explains a service providing method embodied for use at a fitness club according to an exemplary embodiment of the invention.

FIG. 6 explains a service providing method embodied for use at a fitness club according to an exemplary embodiment of the invention. A reference number in FIG. 6 that is the same as the one in FIG. 1 denotes the same device operating in the same manner, and will not be explained hereafter.

Referring to FIG. 6, an external device 127 is located at a fitness club. In this case, the external device 127 can be a server device of the fitness club's Internet home page.

When registering an external device 127 with an authentication server 140, user information such as measurements, physical strength, and particular facts can be included in the selection information, and the external device 127 can request all or a selected portion of the user information. The information on measurements includes a user's various physical dimensions including waist size, chest size, height, weight, and the like. The physical strength includes nutritional intake, results of a recent fundamental strength test, and the like, and the particular facts include case history, dietary history, and the like.

At a fitness club, proper training methods can be provided to a user based on the selection information received from the profile server 110 through the external device 127.

Figure 7:
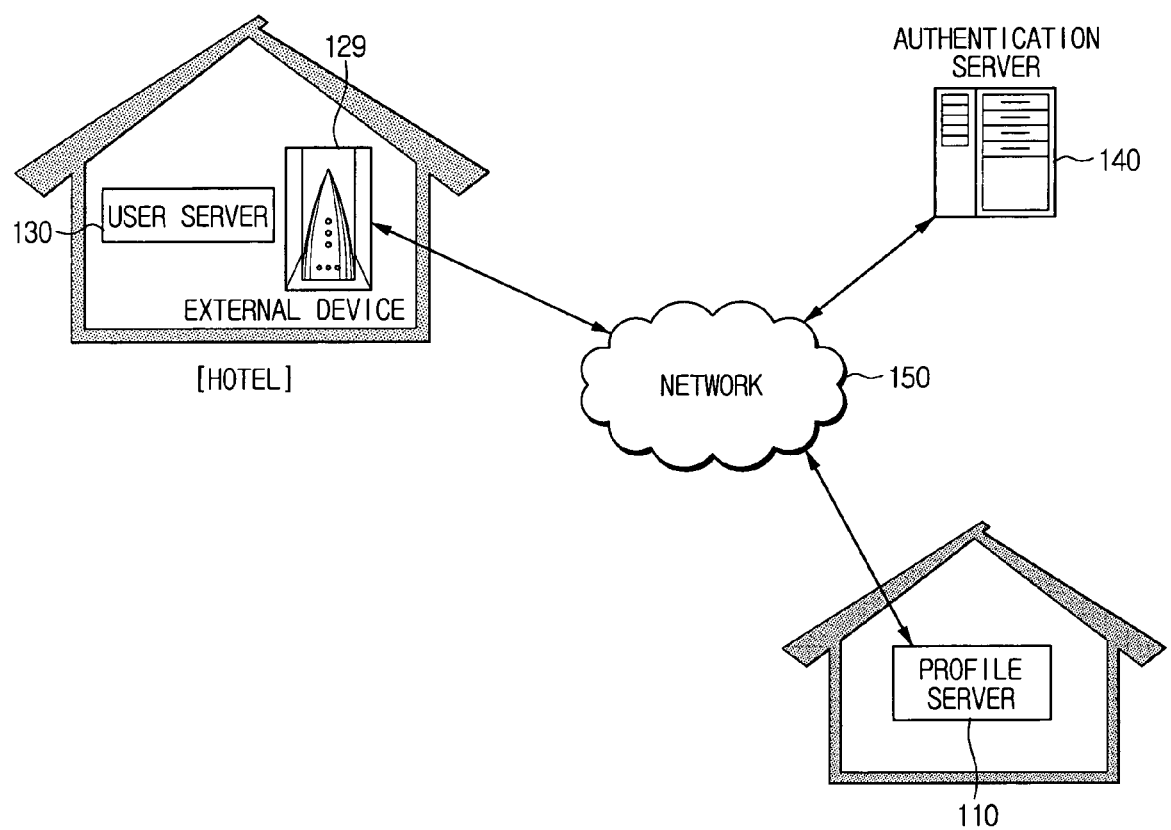
FIG. 7 explains a service providing method embodied for use at a hotel according to an exemplary embodiment of the invention.

FIG. 7 explains a service providing method embodied for use at a hotel according to an exemplary embodiment of the invention. A reference number in FIG. 7 that is the same as the one in FIG. 1 denotes the same device operating in the same manner, and will not be explained hereafter.

Referring to FIG. 7, an external device 129 is located at a hotel. In this case, the external device 129 can be a server device of the hotel's Internet home page.

When registering an external device 129 with an authentication server 140, user information such as user's sleep information, basic living information, and the like can be included in the selection information, and the external device 129 can request all or a selected portion of the user information. The user's sleep information includes information on the time when a user goes to bed, the time when the user gets up, the sleeping conditions, and the like. The basic living information includes the information on a user's preferred television channels, newspapers, music, and the like.

At a hotel, based on the selection information received from the profile server 110 through the external device 129, various services are provided such as providing sleeping environments for a user when the time to sleep arrives, setting up waking conditions corresponding to the wakeup time, providing preferred newspapers and music, and automatically turning on the user's preferred TV and radio channels and programs.

The invention can be embodied in an apparatus or a system. In addition, when the invention is embodied in computer software, the constituent components of the invention can be replaced by code segments that are needed to perform required operations. The programs and code segments can be stored in a medium that can be processed by a microprocessor, and can be transmitted as computer data combined with carrier waves through transmission media or communication networks.

A medium that can be processed by a microprocessor includes an electronic circuit, semiconductor memory element, ROM, flash memory, floppy disk, optical disk, hard disk, optical fiber, wireless network, and the like, which can transfer and store information. In addition, computer data includes data that can be transmitted through an electrical network channel, optical fiber, electromagnetic field, wireless network, and the like.

As explained above, according to the invention, high quality services for a specific person can be provided at a place outside of a home, as well as at home using a profile accumulated at home over a long period of time.

Service providers that can request a profile can be managed and restricted, so that providing unnecessary information and inappropriate information can be prevented.

In addition, using a user's encryption key and decryption key, and a site key utilizing an authentication server, personal information can be prevented from being leaked and used. Furthermore, a user's profile that is provided to an external device is controlled by the authentication server, so that even a service provider who is authorized to request a profile cannot be provided with unnecessary information.

Accordingly, the service providers of a restaurant, store, hospital, fitness club, hotel, and the like can use a user's profile for business, the profile being accumulated over a long period of time, thereby providing the best services to customers.

A restaurant can serve a meal appropriate to a customer's tastes and eating habits. A store can provide information on the best goods to customers using user information. A hospital can make use of a client's case history and obtain the information required for prompt treatment in an emergency situation. A hotel can develop the best sleeping conditions for a customer and provide a customer's preferred TV and radio channels, newspapers, music, and the like, thereby enhancing service quality.

The foregoing embodiment and advantages are merely exemplary and are not to be construed as limiting the present invention. The present teachings can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A service providing method for an external device on a network using profile information, the method comprising:
connecting a user device, comprising a user key, to the external device;
transferring external device information to the user device and receiving by the external device the external device information encrypted using the user key, from the user device;

requesting profile information for serving a user of the user device by transmitting the encrypted external device information to a profile server that stores the profile information; and receiving the profile information provided by the profile server that determines the request as being authorized, wherein the external device is a computer.

2. The method as claimed in claim 1, wherein the user device comprises at least one of wired and wireless interfaces configured to connect the user device to the external device.

3. The method as claimed in claim 1, wherein the encrypted external device information comprises an event number which is created by the user device and decrypted by the profile server for user confirmation.

4. The method as claimed in claim 1, wherein requesting of the profile information is performed using an unencrypted address of the profile server that is received from the user device.

5. The method as claimed in claim 1, wherein the profile information comprises the user's living patterns and wherein a portion of the profile information is selected based on selection information which relates to services provided by the external device and is received from an external source.

6. The method as claimed in claim 5, wherein the user's living patterns comprise at least any one of information regarding eating habits, measurements, preferred styles, preferred colors, sleeping habits, basic living, physical strength, emergency treatments, case history, and particular facts relevant to the user.

7. The method as claimed in claim 1, wherein the determining of the request as being authorized comprises:

granting a site key to the external device using an authentication server prior to receiving the external device information;

inserting the site key into the external device information; and determining, using the site key, whether the external device is an authorized device.

8. The method as claimed in claim 7, wherein the profile information provided by the profile server is selection information needed for the external device out of the profile information, when the external device is determined to be an authorized device.

9. The method as claimed in claim 8, further comprising:

registering with the authentication server a list of the selection information, when granting the site key; and receiving the needed selection information, when the external device is determined to be an authorized device, the needed selection information corresponding to the list registered with the authentication server.

10. The method as claimed in claim 9, wherein receiving of the needed selection information out of the profile information when the external device is determined to be an authorized device further comprises:

searching for the needed selection information from the profile information stored in the profile server according to the list provided by the authentication server; and receiving the needed selection information.

11. The method as claimed in claim 10, wherein receiving the needed selection information further comprises:

encrypting and transmitting the needed selection information to the user device by way of the external device; and receiving the needed selection information decrypted by the user device using the user key.

12. The method as claimed in claim 1, wherein the profile server is a home network server of the user.

13. The method as claimed in claim 1, wherein the user device is one of a Radio Frequency Identification (RFID) and a smart card.

14. The method as claimed in claim 1, wherein no encryption or decryption is performed in the external device wherein the external device relates to providing services to a user of the user device, and wherein the external device selects at least one product or service of the services based on the received profile information.

15. The method as claimed in claim 1, wherein the determining of the request being authorized comprises determining whether the external device is an authorized device based on a request from the profile server.

16. The method as claimed in claim 1, further comprising:

receiving by the user device via the external device the profile information encrypted and transmitted from the profile server;

decrypting by the user device the received profile information; and transmitting the decrypted profile information to the external device.

17. The method as claimed in claim 1, wherein the encryption of the external device information for transmission to the profile server is performed by the user device and wherein the external device transmits the encrypted external device information to the profile server.

18. The method as claimed in claim 17, wherein the received profile information from the profile server by the external device is provided to the user device for decryption.

19. The method as claimed in claim 1, wherein the user device performs encryption and decryption for the external device of information to be transmitted to the profile server and of information received from the profile server.

20. The method as claimed in claim 1, wherein the external device relates to providing at least one service and product selected based on the received profile information.

21. A service providing method for an external device on a network using profile information, the method comprising:

connecting a user device to a profile server that stores profile information for serving a user of the user device;

transferring the profile information to the user device;

transferring to the user device a list of selection information needed by the external device out of the profile information;

selecting by the user using the user device at least some of the information on the list; and receiving by the external device only information selected by the user out of the list of selection information, wherein the external device is a computer.

22. The method as claimed in claim 21, wherein the user device comprises at least one of wired and wireless interfaces configured to connect the user device to the external device.

23. The method as claimed in claim 21, wherein the profile information comprises the user's living patterns.

24. The method as claimed in claim 23, wherein the user's living patterns comprise at least any one of information regarding eating habits, measurements, preferred styles, preferred colors, sleeping habits, basic living, physical strength, emergency treatments, case history, and particular facts relevant to the user.

25. The method as claimed in claim 21, wherein the information selected by the user from the list of selection information comprises an indication of user personal preferences and wherein the profile information comprises information about at least one of food preferences of the user, medical information of the user, and apparel related information of the user.

26. A service providing system using profile information, the system comprising:
   a profile server that stores profile information for serving a user of a user device, receives a request for the profile information, and outputs the profile information if the request is determined as being authorized;
   the user device comprising a user key provided by the profile server; and
   an external device that transmits the request and receives the profile information, the request comprising external device information that was transferred to the user device and returned to the external device after having been encrypted using the user key by the user device,
   wherein the external device is a computer.

27. The system as claimed in claim 26, wherein the user device comprises at least one of wired and wireless interfaces configured to connect the user device to the external device.

28. The system as claimed in claim 27, wherein, in the case where the user device comprises a wireless interface, the wireless interface comprises one of a Radio Frequency Identification (RFID) and a smart card.

29. The system as claimed in claim 26, wherein the user device is configured to create an encrypted event number which is decrypted by the profile server for user confirmation.

30. The system as claimed in claim 26, wherein the external device is configured to receive an unencrypted address of the profile server from the user device together with the encrypted external device information.

31. The system as claimed in claim 26, wherein the profile server is configured to store the profile information comprising the user's living patterns.

32. The system as claimed in claim 31, wherein the profile server is configured to store the profile information comprising the user's living pattern comprising at least any one of information regarding eating habits, measurements, preferred styles, preferred colors, sleeping habits, basic living, physical strength, emergency treatments, case history, and particular facts relevant to the user.

33. The systems as claimed in claim 26, comprising an authentication server that determines whether the request is authorized.

34. The system as claimed in claim 26,
   wherein the authentication server is configured to grant a site key to the external device and confirm the site key; and
   wherein the external device is configured to insert the site key to the external device information.

35. The system as claimed in claim 34, wherein the profile server is configured to transmit to the external device selection information needed for the external device out of the profile information, when the external device is determined to be an authorized one.

36. The system as claimed in claim 35, wherein:
   the authentication server is further configured to register a list of the selection information, when granting the site key; and
   the profile server is further configured to search for the needed selection information from the profile information according to the list provided by the authentication server, and transmits to the external device the needed selection information that has been found as a result of the search.

37. The system as claimed in claim 36, wherein:
   the profile server is configured to encrypt and transmit the needed selection information to the user device by way of the external device; and
   the user device is configured to decrypt and transmit the needed selection information to the external device.

38. The system as claimed in claim 26, further comprising a network, the external device, the authentication server, and the profile server being connected through at least one of wired and wireless interfaces.

39. The system as claimed in claim 26 wherein the profile server is a home network server of the user.

40. A service providing system using profile information, the system comprising:
   a profile server that stores profile information for serving a user of a user device;
   the user device that receives the profile information from the profile server; and
   an external device that transfers to the user device a list of needed selection information out of the profile information, and receives only information selected by the user out of the list of selection information,
   wherein the external device is a computer, and
   wherein said selected information is information that is selected by the user using the user device based on the displayed list of needed selection information received from the profile server.

41. The service providing system as claimed in claim 40, wherein the user device comprises at least one of wired and wireless interfaces configured to connect the user device to the external device.

42. The service providing system as claimed in claim 40, wherein the profile server is configured to store the profile information comprising the user's living patterns.

43. The service providing system as claimed in claim 42, wherein the profile server is configured to store the profile information comprising the user's living patterns comprising at least any one of information on eating habits, measurements, preferred styles, preferred colors, sleeping habits, basic living, physical strength, emergency treatments, case history, and particular facts relevant to the user.

* * * * *